US009749548B2

(12) United States Patent
Zhu et al.

(10) Patent No.: US 9,749,548 B2
(45) Date of Patent: Aug. 29, 2017

(54) VIRTUAL LINEBUFFERS FOR IMAGE SIGNAL PROCESSORS

(71) Applicant: GOOGLE INC., Mountain View, CA (US)

(72) Inventors: Qiuling Zhu, San Jose, CA (US); Ofer Shacham, Palo Alto, CA (US); Jason Rupert Redgrave, Mountain View, CA (US); Daniel Frederic Finchelstein, Redwood City, CA (US); Albert Meixner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 186 days.

(21) Appl. No.: 14/603,354

(22) Filed: Jan. 22, 2015

(65) Prior Publication Data

US 2016/0219225 A1    Jul. 28, 2016

(51) Int. Cl.
*G09G 5/36* (2006.01)
*H04N 5/262* (2006.01)
*G06T 1/60* (2006.01)

(52) U.S. Cl.
CPC .............. *H04N 5/262* (2013.01); *G06T 1/60* (2013.01)

(58) Field of Classification Search
CPC ........ G09G 5/395; G09G 5/363; G09G 5/001; G09G 5/06; G09G 5/14
USPC ........................................ 345/560
See application file for complete search history.

(56) References Cited

U.S. PATENT DOCUMENTS

| 4,445,177 | A |   | 4/1984 | Bratt et al. |
|---|---|---|---|---|
| 4,835,712 | A |   | 5/1989 | Drebin et al. |
| 4,908,644 | A | * | 3/1990 | Shindo .................. G02B 7/365 |
|   |   |   |   | 382/260 |
| 4,935,894 | A |   | 6/1990 | Ternes et al. |

(Continued)

FOREIGN PATENT DOCUMENTS

| EP | 0293701 A2 | 12/1988 |
|---|---|---|
| JP | 2013090070 | 5/2013 |

(Continued)

OTHER PUBLICATIONS

Yu, etc. "Optimizing Data Intensive Window-based Image Processing on Reconfigurable Hardware Boards" Proc. IEEE Workshop On Signal Processing System Design and Implementation, IEEE, Nov. 2005.*

(Continued)

*Primary Examiner* — Ke Xiao
*Assistant Examiner* — Gordon Liu
(74) *Attorney, Agent, or Firm* — Fish & Richardson P.C.

(57) ABSTRACT

In a general aspect, an apparatus can include image processing logic (IPL) configured to perform an image processing operation on pixel data corresponding with an image having a width of W pixels and a height of H pixels to produce output pixel data in vertical slices of K pixels using K vertically overlapping stencils of S×S pixels, K being greater than 1 and less than H, S being greater than or equal to 2, and W being greater than S. The apparatus can also include a linebuffer operationally coupled with the IPL, the linebuffer configured to buffer the pixel data for the IPL. The linebuffer can include a full-size buffer having a width of W and a height of (S−1). The linebuffer can also include a sliding buffer having a width of SB and a height of K, SB being greater than or equal to S and less than W.

20 Claims, 7 Drawing Sheets

(56) References Cited

U.S. PATENT DOCUMENTS

| | | | |
|---|---|---|---|
| 5,253,308 A | 10/1993 | Johnson | |
| 5,612,693 A | 3/1997 | Craft et al. | |
| 5,751,864 A | 5/1998 | Moriwake et al. | |
| 5,892,962 A | 4/1999 | Cloutier | |
| 6,031,573 A * | 2/2000 | MacCormack | G06F 17/30017 348/154 |
| 6,049,859 A | 4/2000 | Gliese et al. | |
| 6,366,289 B1 | 4/2002 | Johns | |
| 6,587,158 B1 * | 7/2003 | Adams | H04N 5/775 345/543 |
| 6,728,862 B1 | 4/2004 | Wilson | |
| 6,745,319 B1 | 6/2004 | Balmer et al. | |
| 6,970,196 B1 | 11/2005 | Ishikawa et al. | |
| 7,010,177 B1 | 3/2006 | Mattison | |
| 7,167,890 B2 | 1/2007 | Lin et al. | |
| 7,200,287 B2 | 4/2007 | Fukuda et al. | |
| 7,286,717 B2 | 10/2007 | Nomizu | |
| 7,583,851 B2 | 9/2009 | Kudo et al. | |
| 7,941,634 B2 | 5/2011 | Georgi et al. | |
| 8,023,539 B2 | 9/2011 | Ueno et al. | |
| 8,156,284 B2 | 4/2012 | Vorbach et al. | |
| 8,321,849 B2 | 11/2012 | Nickolls et al. | |
| 8,436,857 B2 | 5/2013 | Twilleager | |
| 8,508,612 B2 | 8/2013 | Cote et al. | |
| 8,543,843 B1 | 9/2013 | Cheng et al. | |
| 8,650,384 B2 | 2/2014 | Lee et al. | |
| 8,687,223 B2 | 4/2014 | Yamamoto | |
| 8,749,667 B2 | 6/2014 | Noraz et al. | |
| 8,786,614 B2 | 7/2014 | Curry et al. | |
| 8,797,323 B2 | 8/2014 | Salvi et al. | |
| 8,823,736 B2 | 9/2014 | Barringer et al. | |
| 8,970,884 B2 | 3/2015 | Tsuji et al. | |
| 8,976,195 B1 | 3/2015 | Lindholm et al. | |
| 2003/0005365 A1 * | 1/2003 | Wilson | G06F 9/30014 714/38.13 |
| 2005/0270412 A1 | 12/2005 | Kamon et al. | |
| 2006/0044576 A1 | 3/2006 | Tabata et al. | |
| 2006/0228007 A1 | 10/2006 | Knee | |
| 2007/0047828 A1 | 3/2007 | Ishii et al. | |
| 2007/0080969 A1 * | 4/2007 | Yamaura | G06T 1/60 345/535 |
| 2007/0156729 A1 | 7/2007 | Shaylor | |
| 2008/0111823 A1 | 5/2008 | Fan et al. | |
| 2008/0244222 A1 | 10/2008 | Supalov et al. | |
| 2008/0266302 A1 | 10/2008 | Andre et al. | |
| 2009/0002390 A1 | 1/2009 | Kuno | |
| 2009/0228677 A1 | 9/2009 | Liege | |
| 2009/0300621 A1 | 12/2009 | Mantor et al. | |
| 2009/0317009 A1 | 12/2009 | Ren | |
| 2010/0122105 A1 | 5/2010 | Arsian et al. | |
| 2010/0182042 A1 | 7/2010 | Law et al. | |
| 2010/0188538 A1 | 7/2010 | Sugawa et al. | |
| 2011/0055495 A1 | 3/2011 | Wolford et al. | |
| 2011/0087867 A1 | 4/2011 | Jacobson et al. | |
| 2011/0125768 A1 | 5/2011 | Shibao | |
| 2011/0153925 A1 | 6/2011 | Bains et al. | |
| 2012/0320070 A1 | 12/2012 | Arvo | |
| 2013/0027416 A1 | 1/2013 | Vaithianathan et al. | |
| 2013/0202051 A1 | 8/2013 | Zhou | |
| 2013/0243329 A1 | 9/2013 | Oro Garcia et al. | |
| 2013/0314428 A1 | 11/2013 | Chen et al. | |
| 2013/0318544 A1 | 11/2013 | Kuroda et al. | |
| 2014/0019486 A1 | 1/2014 | Majumdar | |
| 2014/0028876 A1 | 1/2014 | Mills | |
| 2014/0136816 A1 | 5/2014 | Krig | |
| 2014/0270478 A1 | 9/2014 | Chen et al. | |
| 2014/0282611 A1 | 9/2014 | Campbell et al. | |
| 2015/0106596 A1 | 4/2015 | Vorbach et al. | |

FOREIGN PATENT DOCUMENTS

| | | |
|---|---|---|
| WO | WO 9409595 A1 | 4/1994 |
| WO | WO 2007/071883 A2 | 6/2007 |

OTHER PUBLICATIONS

Farabet, etc. "NeuFlow: A Runtime Reconfigurable Dataflow Processor for Vision", IEEE Computer Society Conference, Jun. 2011.*

"Multioutput Scaler Reference Design" Altera Corporation, Application Note AN-648-1.0, Aug. 2012, 18 pages.

Hegarty, et al., "Darkroom: Compiling High-Level Image Processing Code into Hardware Pipelines", ACM Transactions on Graphics (TOG)—Proceedings of ACM SIGGRAPH 2014, vol. 33 Issue 4, Jul. 2014, 11 pages.

Yu et al., "Optimizing data intensive window-based image processing on reconfigurable hardware boards", IEEE, Nov. 2, 2005, 18 pages.

Ragan-Kelley et al., "Halide: A Language and Compiler for Optimizing Parallelism Locality and Recomputation in Image Processing Pipelines", PLDI09, Jun. 16, 2013, 12 pages.

PCT/US2015/065564—International Search Report and Written Opinion, mailed Apr. 20, 2016, 15 pages.

Oosterhout, Optimized Pixel Template Image Correlator, Master Thesis, Aug. 19, 1992, 74 pages.

Dykes et al., "Communication and Computation Patterns of Large Scale Image Convolutions on Parallel Architectures," Parallel Processing Symposium, Jan. 1, 1994, 6 pages.

Zhou, Minhua, et al., "Parallel Tools in HEVC for High-Throughput Processing," Applications of Digital Processing, XXXV, Proc. of SPI, vol. 8499, (Jan. 1, 2012), pp. 1-13.

Chen et al., "CRISP: Coarse-Grained Reconfigurable Image Stream Processor for Digital Still Cameras and Camcorders," IEEE Transactions on Circuits and Systems for Video Technology, Sep. 2008, 14 pages.

Cardells-Tormo et al., "Area-efficient 2-D Shift-variant Convolvers for FPGA-based Digital Image Processing," IEEE Workshop on Signal Processing Systems Design and Implementation, Nov. 2, 2005, 5 pages. Levinthal, "Parallel Computers for Graphics Applications", ACM, 1987, pp. 193-198.

Gupta, et al., "A VLSI Architecture for Updating Raster-Scan Displays", Computer Graphics, vol. 15, No. 3, Aug. 1981, pp. 71-78.

Henretty, et al., "A Stencil Compiler for Short-Vector SIMD Architectures", ACM, ICS'13, Jun. 10-14, 2013, Eugene, Oregon, pp. 13-24.

Spampinato, et al., "A Basic Linear Algebra Compiler", ACM, CGO'14, Feb. 15-19, 2014, Orlando Fl, pp. 23-32.

Stojanov, et al., "Abstracting Vector Architectures in Library Generators: Case Study Convolution Filters", ARRAY 14, ACM, Jun. 11, 2014, UK, pp. 14-19.

DeVito, et al., "Terra: A Multi-Stage Language for High-Performance Computing", PLDI'13, Jun. 16-22, 2013, Seattle, Washington, 11 pages.

Sedaghati, et al., "SIVEC: A Vector Instruction Extension for High Performance Stencil Computation," Parallel Architectures and Compilation Techniques, Oct. 10, 2011, 12 pages.

Chao et al., "Pyramid Architecture for 3840×2160 Quad Full High Definition 30 Frames/s Video Acquisition," IEEE Transactions on Circuits and Systems for Video Technology, Nov. 1, 2010, 10 pages.

Bolotoff, Paul V., "Alpha—The History in Facts and Comments" http://alasir.com/articles/a;pha_history/alpha_21164_21164pc.html, Last modification date Apr. 22, 2007,5 pages.

Wahib et al., "Scalable Kernel Fusion for Memory-Bound GPU Applications," SC14: International Conference for High Performance Computing, Networking, Storage and Analysis, Nov. 16, 2014, 12 pages.

Adams, et al. "The Frankencamera: An Experimental Platform for Computational Photography", ACM Transactions on Graphics, vol. 29, No. 4, Article 29, Publication Jul. 2010, 12 pages.

Levinthal, et al., "Chap-A SIMD Graphics Processor", Computer Graphics, vol. 18, No. 3, Jul. 1984, pp. 77-82.

Nightingale, Edmund B., et al., "Helios: Heterogeneous Multiprocessing with Satellite Kernels," SOSP '09, Oct. 11-14, 2009, Big Sky, Montana, U.S.A., (Oct. 11, 2009), 14 pages.

Eichenberger, et al., "Optimizing Compiler for the Cell Processor" PACT, Tuesday, Sep. 20, 2005, Part 1, pp. 1-16.

(56) References Cited

OTHER PUBLICATIONS

Eichenberger, et al., "Optimizing Compiler for the Cell Processor" PACT, Tuesday, Sep. 20, 2005, Part 2, pp. 17-32.
Kapasi, et al. "The Imagine Stream Processor", IEEE, International Conference on Computer Design: VLSI in Computers and Processors (ICCD'02), 2002, 17 pages.
Molnar, et al., "PixelFlow: High-Speed Rendering Using Image Composition" proceedings of Siggraph 92, Computer Graphics, 26, Jul. 2, 1992, 10 pages.
S.F. Reddaway,"DAP—A Distributed Processor Array", ISCA '73 Proceedings of the First Ann. Symposium on Computer Architecture, pp. 61-65.
M.J. Duff, "CLIP 4: A Large Scale Integrated Circuit Array Parallel Processor," Proc. IEEE Int'l Joint Conf. Pattern Recognition, . . . Jan. 2004, pp. 728-733.
Qadeer, et al., "Convolution Engine: Balancing Efficiency & Flexibility in Specialized Computing", ISCA '13 Tel-Aviv, Israel, ACM 2013, pp. 24-35.
Shacham, et al. "Smart Memories Polymorphic Chip Multiprocessor", Proceedings of the $46^{th}$ Design Automation Conference (OAC), San Francisco, CA, Jul. 2009.
DeVito, et al.,"First-class Runtime Generation of High-Performance Types using Exotypes", PLDI'14, Jun. 9-11, ACM, 12 pages.
Clearspeed Whitepaper: CSX Processor Architecture, www.clearspeed.com, 2007, 16 pages.
NVIDIA, "PTX:Parallel Thread Execution ISA Version 1.4", Aug. 23, 2010, 135 pages.
Silicon Hive: "Silicon System Design of Media and Communications Applications", Jun. 13, 2007, 22 pages.
Khronos, SPIR 2.0 "Provisional Specification to Enable Compiler Innovation on Diverse Parallel Architectures", Aug. 11, 2014, 2 pages.
Arasan "Silicon Hive Announces New Image Signal Processor", Eindhoven, the Netherlands, May 16, 2006, http://www.design-reuse.com/news/13362/silicon-hive-image-signal-processor.html, 3 pages.
SPIR, The SPIR Specification, Version 2.0, Revision Date Jun. 5, 2014, 40 pages.
Hanrahan, Pat, "Domain-Specific Languages for Heterogeneous GPU Computing", NVIDIA Technology Conference, Oct. 2, 2009, 30 pages.
Shacham, et al., "Rethinking Digital Design: Why Design Must Change", IEEE micro Magazine, Nov./Dec. 2010.
Goldstein, et al., "PipeRench: A Coprocessor for Streaming Multimedia Acceleration", Carnegie Mellow University, Research Showcase @CMU, Appears in the 26th Annual International Symposium on Computer Architecture, May 1999, Atlanta, Georgia, 14 pages.
Khawam, et al., "The Reconfigurable Instruction Cell Array", IEEE Transactions on Very Large Scale Integration (VLSI) Systems, vol. 16, No. 1, Jan. 2008, pp. 75-85.
"ChimeraTM: The NVIDIA Computational Photography Architecture" Whitepaper, NVIDIA Corporation 2013, 15 pages.
EyeQ2TM, "Vision System on a Chip", Mobileye, Sep. 2007, 4 pages.
Horowitz, Mark, "Computing's Energy Problem: (and what we can do about it)", IEEE, International Solid-State Circuits Conference 2014, 46 pages.
Pelc, Oscar, "Multimedia Support in the i.MX31 and i.MX31L Applications Processors", Freescale Semiconductor, Inc., Feb. 2006, http://cache.freescale.com/files/32bit/doc/white_paper/IMX31MULTIWP.pdf, 12 pages.
Mody, et al., "High Performance and Flexible Imaging Sub-System." In Advances in Computing, Communications and Informatics (ICACCI), 2014 International Conference, pp. 545-548. IEEE, 2014.
Van der Wal, et al., "The Acadia Vision Processor", IEEE proceedings of International Workshop on Computer Applications for Machine Perception, Sep. 2000, http://citeseerx.ist.psu.edu/viewdoc/download?doi=10.1.1.32.3830&rep=rep1&type=pdf, 10 pages.
Stein, et al., "A Computer Vision System On A Chip: A Case Study From The Automotive Domain." IEEE Computer Society Conference, p. 130, 2005.
Tanabe, et al., "Visconti: multi-VLIW image Recognition Processor Based on Configurable Processor [obstacle detection applications]", Custom Integrated Circuits Conference, IEEE, 2003, http://ieeexplore.ieee.org/document/1249387/?arnumber=1249387&tag=1.
Mandal, et al., "An Embedded Vision Engine (EVE) for Automotive Vision Processing." In Circuits and Systems (ISCAS), 2014 IEEE Symposium, pp. 49-52, IEEE, 2014.
Bushey, et al., "Flexible Function-Level Acceleration of Embedded Vision Applications Using the Pipelined Vision Processor." In Signals, Systems and Computers, 2013 Asilomar Conference, pp. 1447-1452, IEEE, 2013.
Moloney, David, "1 TOPS/W Software Programmable Media Processor." Hot Chips 23 Symposium (HCS), IEEE, Aug. 2011, 24 pages.
Moloney, et al., "Myriad 2: Eye of the Computational Vision Storm", Hot Chips 26 Symposium (HCS), IEEE, Aug. 2014, 18 pages.
Parker, Richard, "Embedding Computer Vision in Electronic Devices: How New Hardware and Software Choices Have Changed the Designer's Approach", Future Technology Magazine, pp. 22-23, Feb. 2013.
Ahn, et al., "Evaluating the Image Stream Architecture." In ACM SIGARCH Computer Architecture News, vol. 32, No. 2, IEEE Computer Society, Jun. 2004, 14 pages.
Balfour, et al., "An Energy-Efficient Processor Architecture for Embedded Systems" IEEE Computer Architecture Letters 7, No. 1 p. 29-32, May 2008.
Khailany, et al., "A Programmable 512 GOPS Stream Processor for Signal, Image, and Video Processing", IEEE Journal of Solid-State Circuits, vol. 43, No. 1, pp. 202-213, Jan. 2008.
Olofsson, et al., "A 25 GFLOPS/WATT Software Programmable Floating Point Accelerator" High Performance Embedded Computing Conference, 2010, 2 pages.
de Dinechin, et al., "A Clustered Manycore Processor Architecture for Embedded and Accelerated Applications." In High Performance Extreme Computing Conference (HPEC), IEEE, pp. 1-6, Sep. 2013.
Codrescu, et al., "Hexagon DSP: An Architecture Optimized for Mobile Multimedia and Communications." IEEE Micro vol. 34, Issue 2, pp. 34-43, Mar. 2014.
Pham, et al., "Neu Flow: Dataflow Vision Processing System-On-A-Chip." IEEE $55^{th}$ International Midwest Symposium, Aug. 2012, 4 pages.
Farabet, et al., "Neuflow: a Runtime Reconfigurable Dataflow Processor for Vision." IEEE Computer Society Conference, pp. 109-116, Jun. 2011.
Farabet, et al., "Hardware Accelerated Convolutional Neural Networks For Synthetic Vision Systems." Proceedings of 2010 IEEE International Symposium, pp. 257-260, Jun. 2010.
Chen, et al., "DaDianNao: A Machine-Learning Supercomputer." $47^{th}$ Annual IEEE/ACM International Symposium, pp. 609-622, IEEE, Dec. 2014.
CEVA-MM3101: An Imaging—Optimized DSP Core Swings for an Embedded Vision Home Run, http://www.bdti.com/InsideDSP/2012/01/24/CEVA, Jan. 19, 2012, 3 pages.
Stream Processors, Inc., Company History—Foundational Work in Stream Processing initiated in 1995, https://en.wikipedia.org/wiki/Stream_Processors, Inc, 5 pages.
Gentile, et al., "Image Processing Chain for Digital Still Cameras Based on SIMPil Architecture." ICCP International Conference Workshops, pp. 215-222, IEEE, Jun. 2005.
Hameed, et al., "Understanding Sources of Inefficiency in General-Purpose Chips." ACM SIGARCH Computer Architecture News, vol. 38, No. 3, pp. 37-47, 2010.
Galal, et al., "FPU Generator for Design Space Exploration." $21^{st}$ IEEE Symposium on Computer Arithmetic (ARITH), Apr. 2013, 10 pages.
Dally, William J., "Computer architecture is all about interconnect." Proceedings of $8^{th}$ International Symposium High-Perf. Comp. Architecture, Feb. 2002, 11 pages.

(56) References Cited

OTHER PUBLICATIONS

SCP2200: Image Cognition Processors, https://www.element14,com/community/docs/DOC-50984/I/scp2200-image-cognition-processors, Oct. 25, 2012, 2 pages.

SCP2200: Image Cognition Processors Family [Product Brief], https://www.element14.com/community/docs/DOC-50990, Oct. 26, 2012, 2 pages.

Stream Processors, Inc. Announces Storm-1 Family of Data-Parallel Digital Signal Processors, ISSCC 2007, Feb. 12, 2007, 3 pages. http://www.businesswire.com/news/home/20070212005230/en/Stream-Processors-Announces-Storm-1-Family-Data-Parallel-Digital.

NVIDIA—NVIDIA's Next Generation CUDA™ Compute Architecture: Kepler™, GK110/210, 2014, 23 pages, http://international.download.nvidia.com/pdf/kepler/NVIDIA-Kepler-GK110-GK210-Architecture-Whitepaper.pdf.

MPPA—MANYCORE, Product Family Overview http://www.kalray.eu/IMG/pdf/FLYER_MPPA_MANYCORE-4.pdf, Feb. 2014, 2 pages.

McIntosh-Smith, "A Next-Generation Many-Core Processor With Reliability, Fault Tolerance and Adaptive Power Management Features Optimized for Embedded and High Performance Computing Applications" in Proceedings of the High Performance Embedded Computing Conference (HPEC) 2008, pp. 1-2, 5.

Shacham, Ofer, "Chip Multiprocessor Generator: Automatic Generation Of Custom and Heterogeneous Complete Platforms" Dissertation—Stanford University, May 2011, 190 pages.

NVIDIA Tegra K1—A New Era in Mobile Computing—Whitepapers—Jan. 2014, 26 pages.

NVIDIA Tegra X1—NVIDIA'S New Mobile Superchip—Whitepapers—Jan. 2015, 41 pages.

Chao, et al., "Pyramid Architecture for 3840x2160 Quad Full High Definition 3 D Frames/s Video Acquisition", IEEE Transactions on Circuits and Systems for Video Technology, Nov. 1, 2010, pp. 1499-1507.

Levinthal, "Parallel Computers for Graphics Applications", ACM, 1987, pp. 193-198.

\* cited by examiner

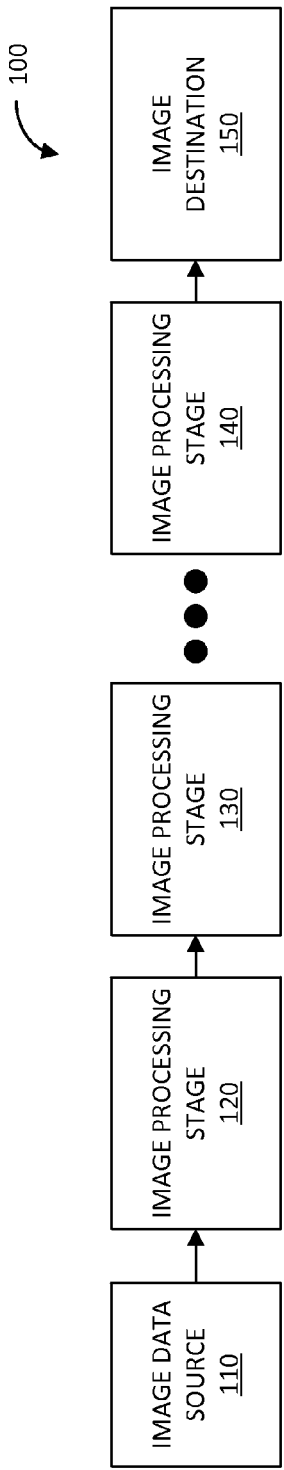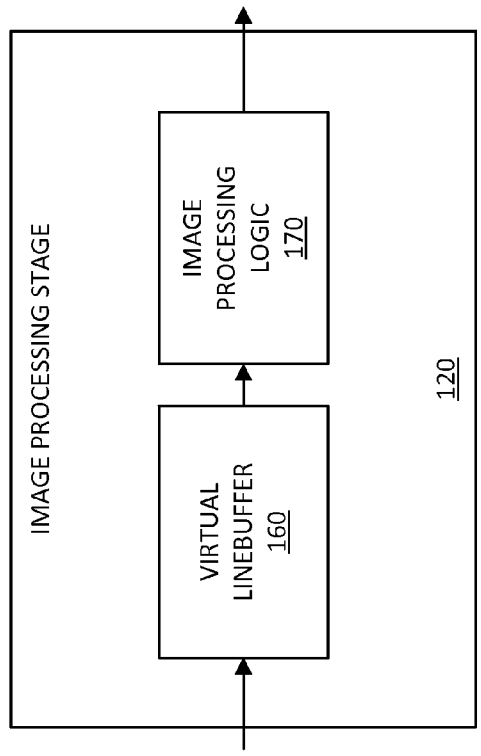
FIG. 1A
FIG. 1B

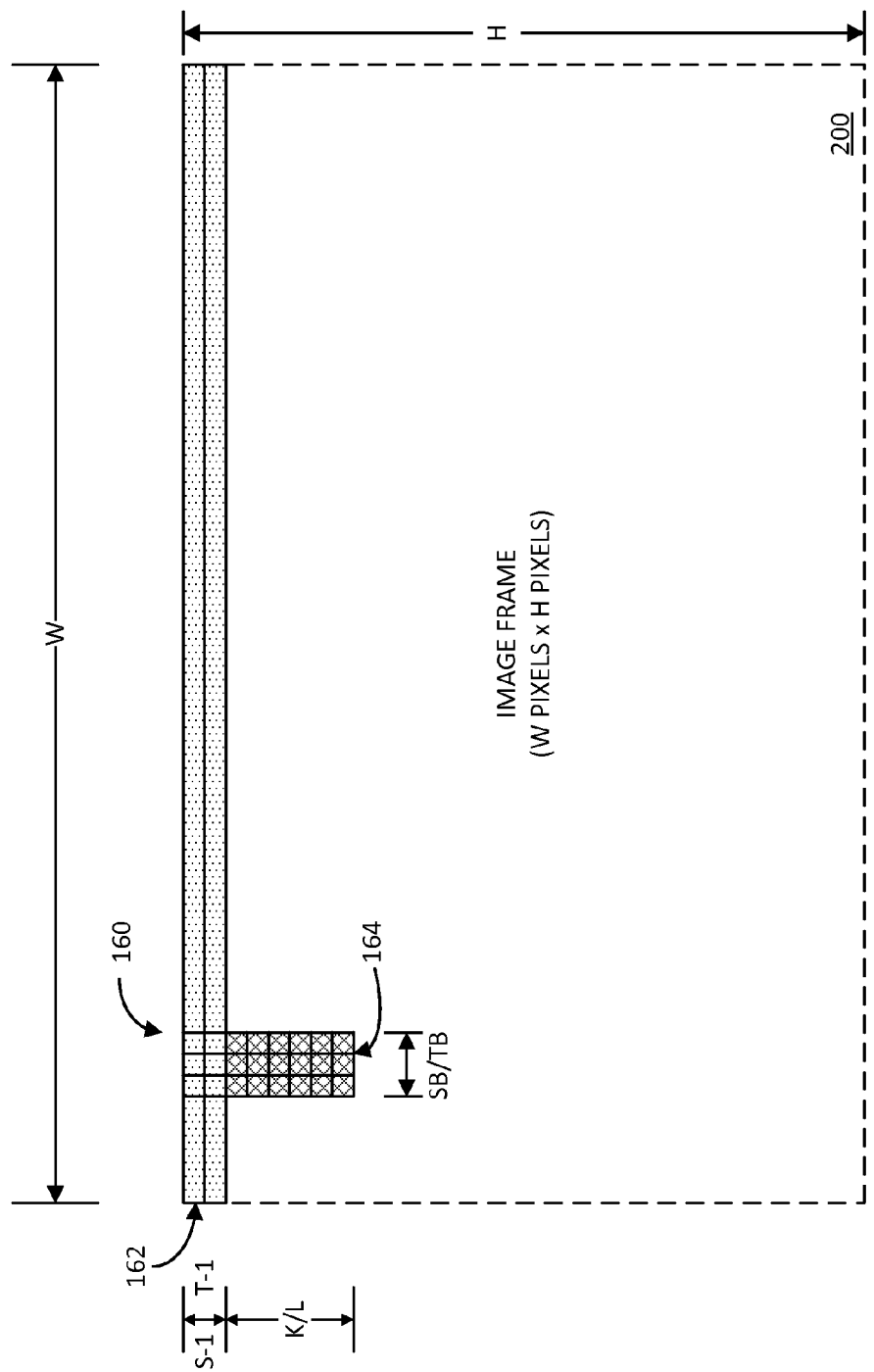

VIRTUAL LINEBUFFERS FOR IMAGE SIGNAL PROCESSORS

TECHNICAL FIELD

This disclosure relates to image processing. More specifically, this disclosure relates to approaches for image pixel processing using linebuffers that include an image-width buffer and/or a partial image-width sliding buffer.

BACKGROUND

The prevalence of consumer electronic devices, such as computers, smartphones, tablets, wearable devices, etc., continues to increase. Such devices often include a display, such as a high-resolution display, and/or an image sensor (e.g., a sensor included in a camera). Image signal processing can be performed in such devices (e.g., to process captured images and/or images stored in electronic memory) using an image signal processor (ISP). Such ISPs can operate, in some implementations, in accordance with a corresponding directed acyclic graph (DAG). For purposes of this disclosure, the term "ISP" will be used to describe such apparatus that are used to implement image signal processing, though other terms may also be appropriate.

Image signal processing (e.g., processing of pixel data corresponding with an image or set of images) by such ISPs can be used in a number of situations. For instance, an image (or series of images, e.g., video) captured by an image sensor (e.g., camera) included in an electronic device can be processed using an ISP, with the fully processed image (or images) being presented on a display of the device and/or stored in electronic memory (e.g., flash memory, dynamic random access memory (DRAM), and so forth) of the electronic device (or operatively coupled with the electronic device). In other instances, for example, an image (or series of images, e.g., video) stored in memory can be processed in an ISP, wherein the fully processed image (or images) (output at the last stage of the ISP) is(are) presented on a display of an associated electronic device and/or is(are) stored in the same memory, or a different memory. The origin and destination of images that are processed by a given ISP can vary based on the particular implementation.

Implementations of ISPs can include a series of cascaded (e.g., pipelined) linebuffers (e.g., static RAM (SRAM) for buffering (storing) image (pixel) data during image signal processing) and associated compute kernels, (e.g., image processing logic for performing image processing functions on the image pixel data). Such image processing functions can include functions that are performed (e.g., in a given sequence) on "stencils" of pixel data corresponding to sub-groups of spatially proximate pixels of a given image or series of images. For instance, such image processing functions can include color interpolation, image sharpening, color correction, and so forth.

Linebuffers, which, as noted above, can be implemented using SRAM memory, can provide local buffering for image pixel data between image processing logic (IPL) stages of an ISP. Pixel data processed by one stage can be written into (buffered for reuse in) a linebuffer for a subsequent processing stage, and so forth, until all processing stages have completed processing of the image (pixel) data. Often, bigger linebuffers (linebuffers that can hold more lines) can be used to facilitate increased throughput via parallelism.

As advances are made in consumer electronic devices, corresponding increases in image resolution, increases in a number of image processing stages (e.g., to facilitate more complex image processing algorithms) and/or requirements for improving image processing throughput can result in an undesirable increase in an amount of memory (e.g., SRAM) used to implement linebuffers in a corresponding ISP. For example, in order to achieve desired performance for a given ISP, an amount of memory used to implement linebuffers for that ISP can increase to an amount that is prohibitive from a cost perspective, (e.g., an amount of silicon area used, product design cost, etc.), and/or a power consumption (e.g., dynamic and/or static power consumption) perspective.

SUMMARY

In a general aspect, an apparatus includes image processing logic (IPL) configured to perform an image processing operation on pixel data corresponding with an image having a width of W pixels and a height of H pixels to produce output pixel data in vertical slices of K pixels using K vertically overlapping stencils of S×S pixels, where K is greater than 1 and less than H, S is greater than or equal to 2, and W is greater than S. The apparatus also includes a linebuffer operationally coupled with the IPL, the linebuffer configured to buffer the pixel data for the IPL. The linebuffer includes a full-size buffer having a width of W and a height of (S−1). The linebuffer also includes a sliding buffer having a width of SB and a height of K, SB being greater than or equal to S and less than W.

Example implementations can include one or more of the following features. For instance, the IPL can be configured to produce the vertical slices of the output pixel data in a raster order. An image processing function of the IPL can be programmable. An image processing function of the IPL can be fixed.

The IPL can be a first IPL, the linebuffer can be a first linebuffer, the image processing operation can be a first image processing operation and the output pixel data can be first output pixel data. The apparatus can include second IPL configured to perform a second image processing operation on the first output pixel data to produce second output pixel data in vertical slices of L pixels using L overlapping stencils of T×T pixels, L being greater than 1 and less than H, T being greater than or equal to 2. The apparatus can include a second linebuffer operationally coupled between the first IPL and the second IPL, the second linebuffer configured to buffer the first output pixel data for the second IPL. The full-size buffer can be a first full-size buffer and the sliding buffer can be a first sliding buffer. The second linebuffer can include a second full-size buffer having a width of W and a height of (T−1) and a second sliding buffer having a width of TB and a height of L, TB being greater than or equal to T and less than W. L can be equal to K and T can be equal to S. L can be not equal to K and T can be not equal to S.

The apparatus can include an image data source operationally coupled with the linebuffer. The image data source can be configured to store the pixel data corresponding with the image. W can be at least an order of magnitude greater than S. The full-size buffer can include a circular data buffer. The sliding buffer can include a first-in-first-out (FIFO) data buffer.

In another general aspect, an apparatus includes image processing logic (IPL) configured to perform an image processing operation on pixel data corresponding with an image having a width of W pixels and a height of H pixels to produce output pixel data in slices having a height of K pixels and a width of J pixels using K×J overlapping stencils of S×S pixels. K and J are greater than 1 and less than H, S is greater than or equal to 2, and W is greater than S. The apparatus also includes a linebuffer operationally coupled with the IPL, the linebuffer configured to buffer the pixel data for the IPL. The linebuffer includes a full-size buffer having a width of W and a height of (S−1) and a sliding buffer having a width of SB and a height of K, SB being greater than or equal to S+(J−1) and less than W.

Example implementations can include one or more of the following features. For instance, the IPL can be a first IPL, the linebuffer can be a first linebuffer, the image processing operation can be a first image processing operation and the output pixel data can be first output pixel data. The apparatus can include second IPL configured to perform a second image processing operation on the first output pixel data to produce second output pixel data slices and a second linebuffer operationally coupled between the first IPL and the second IPL, the second linebuffer configured to buffer the first output pixel data for the second IPL. A slice of the second output pixel data slices produced by the second IPL can have a height of K and a width of J. A slice of the second output pixel data slices produced by the second IPL can have a height that is not equal to K and a width that is not equal J. The IPL can be configured to produce the slices of the output pixel data in a raster order.

In another general aspect, an image signal processor (ISP) includes an image data source configured to buffer pixel data corresponding with an image having a width of W pixels and a height of H pixels. The ISP also includes a first image processing stage having first image processing logic (IPL) configured to perform a first image processing operation on pixel data corresponding with an image having a width of W pixels and a height of H pixels to produce first output pixel data in vertical slices of K pixels using K vertically overlapping stencils of S×S pixels, K being greater than 1 and less than H, S being greater than or equal to 2, and W being greater than S. The first image processing stage also includes a first linebuffer operationally coupled with the first IPL, the first linebuffer configured to buffer the pixel data for the first IPL. The first linebuffer includes a first full-size buffer having a width of W and a height of (S−1) and a first sliding buffer having a width of SB and a height of K, SB being greater than or equal to S and less than W. The ISP further includes a second image processing stage having second IPL configured to perform a second image processing operation on the first output pixel data to produce second output pixel data in vertical slices of L pixels using L overlapping stencils of T×T pixels, L being greater than 1 and less than H, T being greater than or equal to 2. The second image processing stage also includes a second linebuffer operationally coupled between the first IPL and the second IPL, the second linebuffer configured to buffer the first output pixel data for the second IPL.

Example implementations can include one or more of the following features. For instance, the second linebuffer can include a second full-size buffer having a width of W and a height of (T−1) and a second sliding buffer having a width of TB and a height of L, TB being greater than or equal to T and less than W. T can be equal to S, and L can be equal to K.

The details of one or more implementations are set forth in the accompanying drawings and the description below. Other features will be apparent from the description and drawings, and from the claims.

BRIEF DESCRIPTION OF THE DRAWINGS

FIG. 1A is a block diagram illustrating, an image signal processor (ISP), according to an implementation.

FIG. 1B is a block diagram illustrating, an image processing stage that can be included in the ISP of FIG. 1A, according to an implementation.

FIG. 2 is a block diagram illustrating operation of a virtual linebuffer included in an image processing stage, according to an implementation.

Like reference symbols in the various drawings indicate like elements.

DETAILED DESCRIPTION

Figure 3:
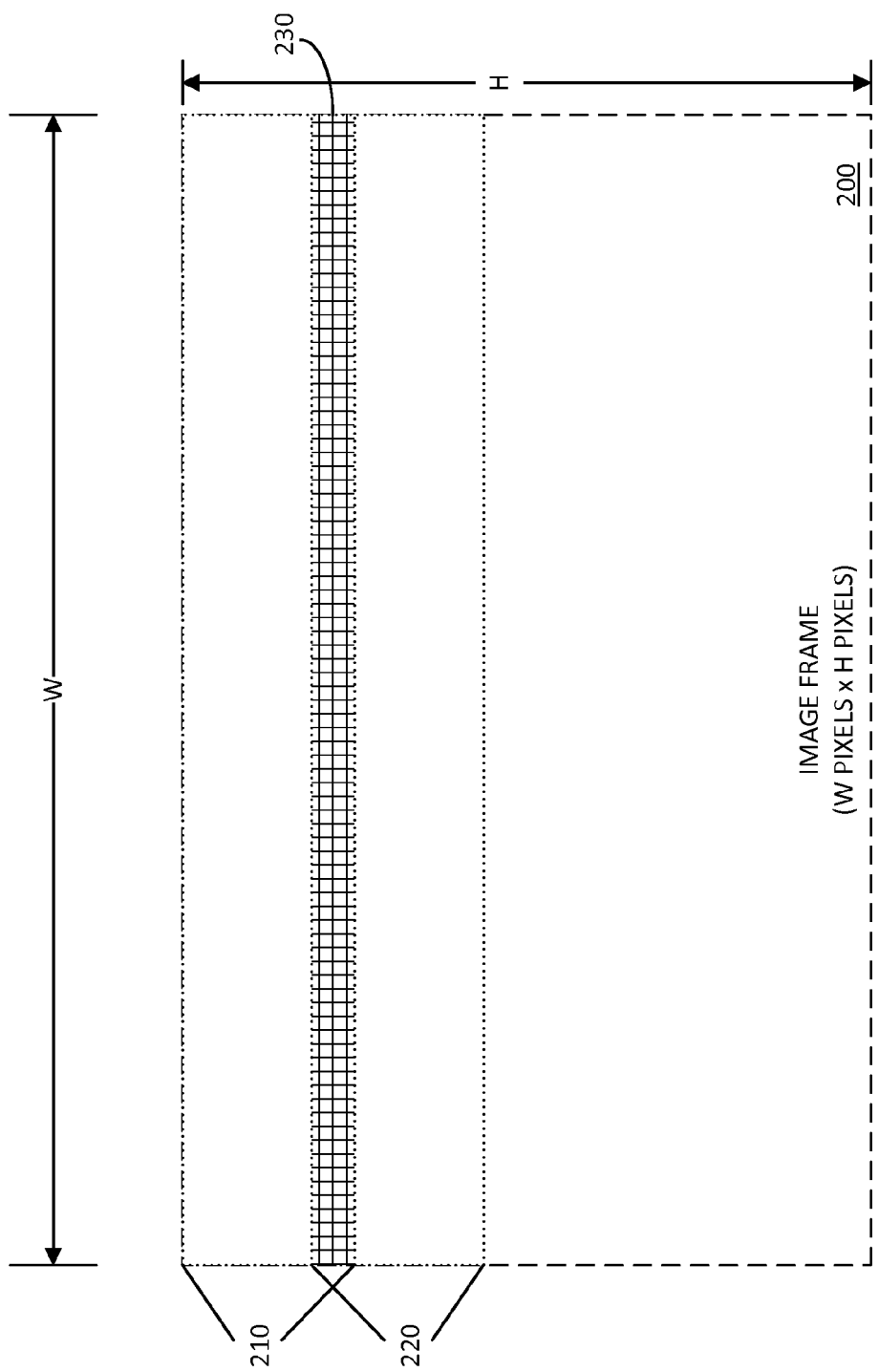
FIG. 3 is a diagram illustrating two consecutive slice-rows that can be produced using an image processing stage including a virtual linebuffer, according to an implementation.

This disclosure is directed to apparatus and methods for processing image data (which can also be referred to as pixel data, image pixel data, image signals, and so forth), where the image data is processed by an image signal processor (ISP) that includes virtual linebuffers, as are described further below. Specifically, the techniques described herein can be used to process image data (e.g., pixel data, image signals, etc.) for photographic images, video images, etc., with an ISP that includes one or more virtual linebuffers. Such virtual linebuffers can be implemented with a fraction of the memory that is used to implement full image-width linebuffers (traditional linebuffers with a same height as a given virtual linebuffers). Accordingly, ISPs implemented using the approaches described herein can reduce product costs and/or power consumption, as compared to ISPs that are implemented using full image-width tall linebuffers.

While the disclosure is generally directed to image data processing, and to the use of virtual linebuffers in ISPs for image data processing, it will be understood that the approaches described herein can be used with other types of data. For instance, virtual linebuffers, such as those described herein, can be used in circuits and/or device configured to process data sets (image date or otherwise) where the computation is repeated on overlapping address windows. For instance, such approaches could be used to process audio data, as one example. In such an approach, the audio data could be arranged in two-dimensions, e.g., with time on a first axis and frequency on a second axis.

FIGS. 1A and 1B are a block diagrams illustrating, respectively, an image signal processor (ISP) 100 and an image processing stage 120 that can be included in the ISP 100, according to an implementation. The arrangement of the ISP 100 shown in FIG. 1A, and the image processing stage 120 shown in FIG. 1B, are given by way of example, and for purposes of illustration. Depending on the particular implementation (e.g., a particular device in which such an ISP is included), the arrangement of the ISP 100 and the image processing stage 120 can vary.

As shown in FIG. 1A, the ISP 100 includes an image data source 110. The image data source 110 can take a number of forms. For instance, in an implementation, the image data source 110 can include an image stored in electronic memory, such as flash memory, DRAM and so forth. In another implementation, the image data source can include an image sensor (e.g., a complementary metal-oxide semiconductor (CMOS) image sensor, or the like). In other implementations, the image data source 110 can take other forms.

The ISP 100 of FIG. 1A also includes a series of pipelined (cascaded, sequential, etc.) image processing stages 120, 130, 140. As indicated in FIG. 1A, a number of image processing stages included in the ISP 100 can vary. For instance, the ISP 100 could include fewer image processing stages, or could include additional image processing stages than are shown in FIG. 1A. The ISP 100 of FIG. 1A is given by way of example and for the purposes of illustration. ISPs can generally come in many directed graph shapes where one or more processing stages produce data that is later consumed by one or more downstream processing stages.

The ISP 100 further includes an image destination 150, which can also take a number of forms depending on the implementation. For example, the image destination 150 may include a display of an electronic device, such as a high-resolution display. In other implementations, the image destination may include electronic memory, e.g., flash memory or other types of electronic memory.

In the ISP 100, each of the image processing stages 120, 130, 140 can receive an input pixel stream (corresponding with an image being processed) from the previous block and generate an output pixel stream (after performing a respective image processing function). That is, the image processing stage 120 can receive an input pixel stream from the image data source 110, perform an image processing function on the pixel stream and generate an output pixel stream. In this instance, the input data source 110 can be referred to as a pixel stream producer (producer) and the image processing stage 120 can be referred to as the pixel stream consumer (consumer). The output pixel stream produced by the image processing stage 120 (the producer in this instance) can then be used as an input pixel stream of the image processing stage 130 (the consumer), which can perform a different image processing operation (than the image processing of stage 120) on the pixel stream, and so forth for each subsequent image processing stage of the ISP 100. As shown in FIG. 1A, an output pixel stream from the image processing stage 140 (as a producer) can be used as the input pixel stream for the image destination 150. Depending on the specific implementation, the image processing functions for each of the image processing stages 120, 130, 140 can be fixed or can be programmable.

FIG. 1B illustrates an implementation of an image processing stage 120 that can be implemented in the ISP 100 of FIG. 1A (e.g., for the image processing stages 120, 130, 140, etc.). In other implementations, the arrangement of the image processing stages 120, 130, 140 may vary. The arrangement shown in FIG. 1B is given by way of example and for purposes of illustration.

The image processing stage 120, as shown in FIG. 1B, includes a virtual linebuffer 160 and image processing logic (IPL) 170. In such an arrangement, the virtual linebuffer 160 can be configured to buffer a spatially local subset of pixel data for an image being processed in the ISP 100 for processing by the IPL 170. In an implementation, after one subset of pixel data (e.g., that is buffered in the virtual linebuffer 160) is processed by the IPL 170, the processed pixel data subset can be written to a line buffer of a next stage (e.g., a consumer) and a new subset of pixel data can be read into the virtual linebuffer 160 for processing by the IPL 170. Data for an image being processed by the ISP 100 can be processed in such subsets in a raster scan order (e.g., left-to-right, from top-to-bottom).

In an implementation, the IPL 170 can apply an image processing function to the subsets of pixel data (e.g., which can be buffered in the virtual linebuffer 160 in a raster scan order) using a number of overlapping stencils, where a given, single stencil (which can also be referred to as a support region) is used to produce a set of output pixels from a group of spatially proximate pixels (e.g., by applying the IPL 170's image processing function to the data for the pixels within a given stencil). For instance, in an implementation, a stencil of size of S×S can be used by the IPL 170 when performing its respective image processing operation. Depending on the specific implementation, S can have a value of greater than or equal to 2. For instance, the IPL 170 could use a stencil of size 2×2, 3×3, 4×4, 5×5, etc.

For stencils with an odd size, an output pixel for a given stencil can be the center pixel, while for even-sized stencils, an output pixel for a given stencil can be offset (i.e., not determined at a center of the stencil). In other implementations, the output pixel for a given stencil operation can be programmable or can depend on the specific image processing function that is implemented by the IPL 170.

By way of illustration, in a current ISP implementation, presuming that image pixel data is processed in a raster scan order and a stencil of size S×S is used by a given IPL, a producer stage (supplying a pixel stream) has to generate (S−1) full-size image lines, plus S more pixels, before a next IPL stage can start to process its incoming pixel stream. Accordingly, the linebuffers in such implementations need to be large enough to buffer (S−1) full image-width lines of pixel data, plus pixel data for at least S more pixels in a partial line. If a processing stage of an ISP implementation is configured to process multiple, vertically overlapping stencils at the same time (e.g., in parallel to increase throughput, or in some modified raster scan order) the number of full image-width lines can increase in correspondence with the number of overlapping stencils that are processed together.

Therefore, in order to allow for processing of image data by a given image processing stage using such vertically overlapping stencils, the linebuffer associated with that IPL would be increased in height (e.g., would be taller). In current ISP implementations, such approaches require increasing the size of the linebuffer so that it can buffer enough full image-width lines of pixel data to support processing of the overlapping stencils of pixel data. For example, in order to process six vertical (K=6) overlapping 3×3 (S=3) stencils, a linebuffer would need to be large enough to buffer eight (K+(S−1)) full image-width pixel data lines, plus three additional pixels on an ninth line. For a device with an image width of 1,000 pixels, this would require a minimum of 64,003 bits of SRAM (assuming one byte per pixel) in just a single linebuffer. Depending on the number of image processing stages, the number of bits per pixel, the size of stencils, and the stencil parallelism, the amount of SRAM needed could easily result in the drawbacks discussed above.

In the approaches described herein, the image processing stage 120 shown in FIG. 1B, with the virtual linebuffers 160 (which is described further below), can be used to process (e.g., in parallel) a plurality of overlapping stencils (e.g., overlapping groups of pixel data) to generate a plurality of output pixels, while avoiding the drawbacks of current implementations using full image-width tall linebuffers. Briefly, the IPL 170 and the virtual line buffer 160 are configured to allow for processing pixel data with a number overlapping stencil operations without a significant increase in the number of memory (e.g., SRAM) cells in the virtual linebuffer 160.

In such an approach, the virtual linebuffer 160 can include a full-size buffer (e.g., that is configured to buffer full-width image lines) with a height that is dependent on the stencil size in the IPL 170 (not on the number of overlapping stencils that are processed by the IPL 170). The virtual linebuffer can also include a sliding buffer (e.g., that is configured to buffer partial-width image lines), with a height and/or width that is(are) dependent on the number of overlapping stencils being processed (e.g., vertically and/or horizontally overlapping), where the width can also be dependent on the pixel width (size) of the overlapping stencils.

Returning to the example above, if the IPL 170 of the image processing stage 120 is configured to perform six (K=6) vertically overlapping 3×3 (S=3) stencil operations at a time, the virtual line buffer 160 can be configured to buffer two (S−1) full image-width pixel data lines and six (K) partial lines of at least 3 (S) pixels. The number of pixels in the partial lines can depend on the read and write speeds and bandwidth of the memory used to implement the sliding buffer. For the image width of 1000×8-bit pixels in the above example, the virtual linebuffer 160 could include 16,018 bits of SRAM, as compared to 64,003 bits, a reduction of approximately 75%.

Further, the use of a virtual linebuffer, such as the virtual linebuffer 160, can allow for processing additional overlapping stencils by only adding an additional partial line of pixel data that has a width that is at least as wide as the stencil (or at least as wide as a width of horizontally overlapping stencils). In this example, with six vertically overlapping 3×3 stencil operations, data for partial rows of at least three pixels can be used.

Accordingly, such approaches (e.g., using the virtual linebuffer 160) incur a small memory incremental overhead for processing additional overlapping stencils at a given time, as compared to a linebuffers that are implemented using a number of full-width image lines that are based on the stencil size and the number of overlapping stencils being processed, such as discussed above. Therefore, using the approaches described herein may allow for using reduced SRAM capacity in the virtual linebuffer 160, enable reduction of static and dynamic energy use, and also increase a ratio of compute capacity to linebuffer memory capacity for a given ISP.

FIG. 2 is a block diagram illustrating operation of a virtual linebuffer 160 that can be included between image processing stages, such as the image processing stage 120 of FIG. 1B, according to an implementation. For instance, the virtual linebuffer 160 of FIG. 1B can be configured to operate as discussed below with respect to FIG. 2, and also configured to operate as discussed with respect to the example implementations illustrated in FIGS. 3-6. The operation of a virtual linebuffer, as discussed with respect to FIG. 2 (as well as FIGS. 3-6), is given by way of example and for purposes of illustration. In the following discussion, FIGS. 2-6 are described with further reference to FIGS. 1A and 1B, as appropriate.

In other implementations, the approaches illustrated in FIGS. 2-6 can be used in ISPs and image processing stages having different configurations. For example, in a given ISP 100, each of the linebuffers (e.g., virtual linebuffers 160) can have a similar configuration, while in other implementations, each of (or at least some of) the linebuffers in an ISP can have different configurations. For instance, in some implementations, each of (or at least some of) the linebuffers in the ISP 100 can operate based on a common stencil size, and also operate in conjunction with the IPLs 170 that are each configured (or at least some are configured) to perform a common number of overlapping stencil operations at a time. In other implementations, each of (or at least some of) the linebuffers in the ISP 100 can operate based on different stencil sizes, and/or operate in conjunction with the IPLs 170 that are each (or at least some of are) configured to perform a different number of overlapping stencil operations at a time. The particular configuration of the linebuffers and the IPL stages for a given ISP will depend on the particular implementation.

In FIG. 2, an image frame 200 for an image that is to be processed by an image processing stage 120 that includes a virtual linebuffer 160 is illustrated. As shown in FIG. 2, the image frame 200 has a width of W pixels and a height of H pixels. In this example, the image frame 200 can be considered to correspond with a high-resolution (photo or video) image, where W and H are both greater than or equal to 1,000. In some implementations, W can be equal to H, while in other implementations W and H can have different values.

In the example of FIG. 2, an image corresponding with the image frame 200 can be processed by the IPL 170 (e.g., included in an ISP 100) that is configured to perform an image processing kernel (e.g., a specific convolution function) on pixel data corresponding with the image. The IPL 170 can receive an input pixel stream from a previous (producer) stage of the ISP 100 and apply its image processing kernel (in a raster scan order) to generate an output pixel data stream, in vertical slices of K pixels, using K vertically overlapping stencils of S×S pixels. In an implementation, K can be greater than 1 and less than H, S can be greater than or equal to 2, and W can be greater than S.

In other image processing stages of an associated ISP, another set of IPL could receive an input pixel stream from a previous stage of the ISP 100 and apply a different image processing kernel (in a raster scan order) to generate output pixel data in vertical slices of L pixels using L vertically overlapping stencils of T×T pixels. In an implementation, L can be greater than 1 and less than H, T can be greater than or equal to 2, and W can be greater than T. In some implementations, K can equal L, while in other implementations, K have a different value than L. Likewise, in certain implementations, S can be equal to T, while in other implementations, S can have a different value than T.

FIG. 2 references each of these variables (K, L, S and T) in a specific example. In the example of FIG. 2, the values of K and L are both 6, and the values of S and T are both 3. However, it will be appreciated that in other implementations, K, L, S and/or T can have other values than those illustrated in FIG. 2, and that the arrangement shown in FIG. 2 is merely given by way of example and for purposes of illustration. In the following discussion, the approach illustrated in FIG. 2 will be described with reference to FIG. 2, where associated IPL processes image data using K=6 vertically overlapping stencils that have a stencil size of 3×3 (S=3) pixels, which is consistent with the example shown of FIG. 2.

In FIG. 2, processing of pixel data for the image data that is associated with the image frame 200 is illustrated using a virtual linebuffer 160. The virtual linebuffer 160 can be configured to buffer the input pixel data stream for processing by associated IPL, such as discussed above. As shown in FIG. 2, the virtual linebuffer 160 can include a full-size buffer 162 having a width of W pixels of pixel storage and a height of 2 rows (S−1), resulting in the virtual linebuffer 160, in this example, including memory for two full image-width rows.

As also show in FIG. 2, the virtual linebuffer 160 can also include a sliding buffer 164. In this example implementation, the sliding buffer 164 can have a width of SB (or TB for other stages of IPL using stencils of, e.g., width T). As also shown in FIG. 2, the sliding buffer 164 can have a height of K partial rows, which is six pixels high in this example, SB can being greater than or equal to S (S can be 3 or more in this example) and less than W. Accordingly, the sliding buffer 164 in this example can be implemented as six (K or L, as appropriate) partial image pixel data rows that are each at least 3 (SB or TB) pixels wide (e.g., using 18 pixels, that for 8-bit pixels occupy 18×8 SRAM cells, as discussed above). The value of SB (or TB as appropriate) may depend, at least in part, on read and write rates of the SRAM that is used to implement the sliding buffer 164 (e.g., as a first-in-first-out (FIFO) buffer).

When processing the image data associated with the image frame 200 of FIG. 2, associated IPL 170, in conjunction with the virtual linebuffer 160, can be configured to produce an output pixel data stream in vertical slices of K pixels, where the vertical slices of K pixels (which can each be referred to as a slice or an output slice) are produced in a raster scan order. The order in which an IPL stage computes the pixels of a given slice can be a modified raster order, such as a raster order within a given block or slice. In an implementation, each time a slice of pixels (input slice) is moved from a virtual linebuffer 160 to an associated IPL 170's circuitry, a column (output slice) of K output pixels is written to the next (consumer) stage (such as to a linebuffer of a subsequent image processing stage 120). An image width wide row of output slices can be referred to as a slice-row.

Generalizing the approach illustrated in FIG. 2, if a consumer (e.g., IPL 170) is configured to produce output slices in columns of K pixels, then a producer providing an input pixel stream to the consumer will produce (S−1) full image-width lines (rows), where a stencil of S×S is used, and then produce K more partial rows of at least S pixels before the consumer stage can begin processing the output pixel stream of the producer, which is the input pixel stream of the consumer. In other words, in such an approach, the Sth line through the (S+(K−1))th lines in the virtual linebuffer 160 do not need to be full lines. Those lines can, instead, simply include a small window (e.g., a sliding buffer 164) with a height K (or L, as noted above) and a width greater than or equal to SB (or TB, as noted above).

The full-size buffer (of S−1 full image-width pixel data lines) can be used, as a circular buffer to continuously buffer overlapping (S−1) full image-width pixel data lines that are reused between successive slice-row rasters. In other words, the last S−1 rows of the sliding buffer (after they are processing by the IPL to produce a corresponding output slice) can be written to the full-size buffer 162, overwriting already used and no longer needed pixel data. Further, the sliding buffer 164 can be used to buffer output pixel data from a previous (producer) stage (e.g., an image processing stage 120) of the ISP 100. That buffered output pixel data from the producer can then be consumed by the consumer IPL 170 to produce a corresponding output slice, with this process repeating to process the entire image associated with the image frame 200.

In an implementation, initialization of the ISP 100 of FIG. 1, where the ISP is implemented with virtual linebuffers 160, as described with respect to FIG. 2, can be accomplished as follows. First, (S−1) pixel data lines of the full-size buffer 162 can be filled by a previous (producer) stage (e.g., when a stencil of S×S is used). The producer stage (e.g., a compute kernel) can then write pixel data into the sliding buffer 164 in single columns of K pixels (6 pixels in the example discussed above) at a time. The consumer compute kernel can begin processing image data that is buffered in its virtual linebuffer 160 as soon as there are S (3) columns of pixels available in the sliding buffer 164, which is equivalent to the stencil width for the consumer stage in this example.

In some implementations, processing of pixel slices within a slice-row can be in a sequential raster scan order, while processing of pixels in a given slice can be done in any order. Accordingly, as previously indicated, the sliding buffer 164 can be implemented using, for example, a customized FIFO memory, though other approaches are possible. Each time a new column (output slice) of pixels is produced by a producer stage, the output slice can be inserted at the end of a sliding buffer 164 of a consumer stage associated with the producer stage (e.g., the next image processing stage). As previously discussed, the width of the sliding buffer 164 for a given image processing stage can be determine based on the stages output slice width as well as write and read rates for the sliding buffer 164. However, the width of the sliding buffer 164 (SB or TB) can be at least an order of magnitude less than a width of the full-size buffer 162, which is determined by the width W of image frame 200.

Using such an approach for implementing an ISP 100 that includes virtual linebuffers 160, such as illustrated in FIGS. 1B and 2, has a number of benefits. For example, the number of image pixel data lines in the full-size buffer 162 is (S−1), which is dependent on the stencil size used by an associated IPL 170. The number of image pixel data lines in the full-size buffer 162 is independent of the number of vertical stencils that are processed to produce an output slice, which makes such approaches highly scalable. For instance, adding additional overlapping stencils can be done by adding an equivalent number of partial rows (and/or columns) in the sliding buffer 164. Another benefit of such approaches is that, because the sliding buffer 164's width is much smaller than the width of the full-size buffer 162, the amount of memory used to implement the virtual linebuffers can be significantly reduced as compared to approaches where all rows (except a single partial row) in a linebuffer are the same width as the image frame width.

FIG. 3 is a diagram illustrating two consecutive slice-rows that can be produced using an image processing stage 120 including a virtual linebuffer 160, according to an implementation. For purpose of illustration, FIG. 3 will be described with further reference to FIGS. 1A, 1B and 2, as appropriate. The approaches illustrated in FIG. 3 can, however, be implemented in ISPs, image processing stages and linebuffers having other arrangements.

FIG. 3 illustrates an example full image-width pixel data rows that are buffered in the virtual linebuffer 160 when producing two successive slice-rows 210 and 220 using a raster scan order iteration. During a first scan, the working slice (sliding buffer 164) can move left to right and is consumed by a consumer compute kernel, one slice of K pixels after another. When the working slice (sliding buffer 164) reaches the end of the slice-row 210, W×K (or W×L) output pixels will have been computed and the computation of the entire slice-row 210 (with a width of W) is complete.

After completing the computations for the slice-row 210, the same process can be repeated for the second slice-row 220. As shown in FIG. 3, there are (S−1) overlapping image lines between the first slice-row 210 and the second slice row 220, where S×S represents a stencil size used in the raster scans used to produce the slice-rows 210 and 220. The reason for the (S−1) overlapping row is that the last (S−1) image lines of the first slice-row 210 are re-used for the computing the pixels in the second slice-row 220 (the yellow region).

Figure 4:
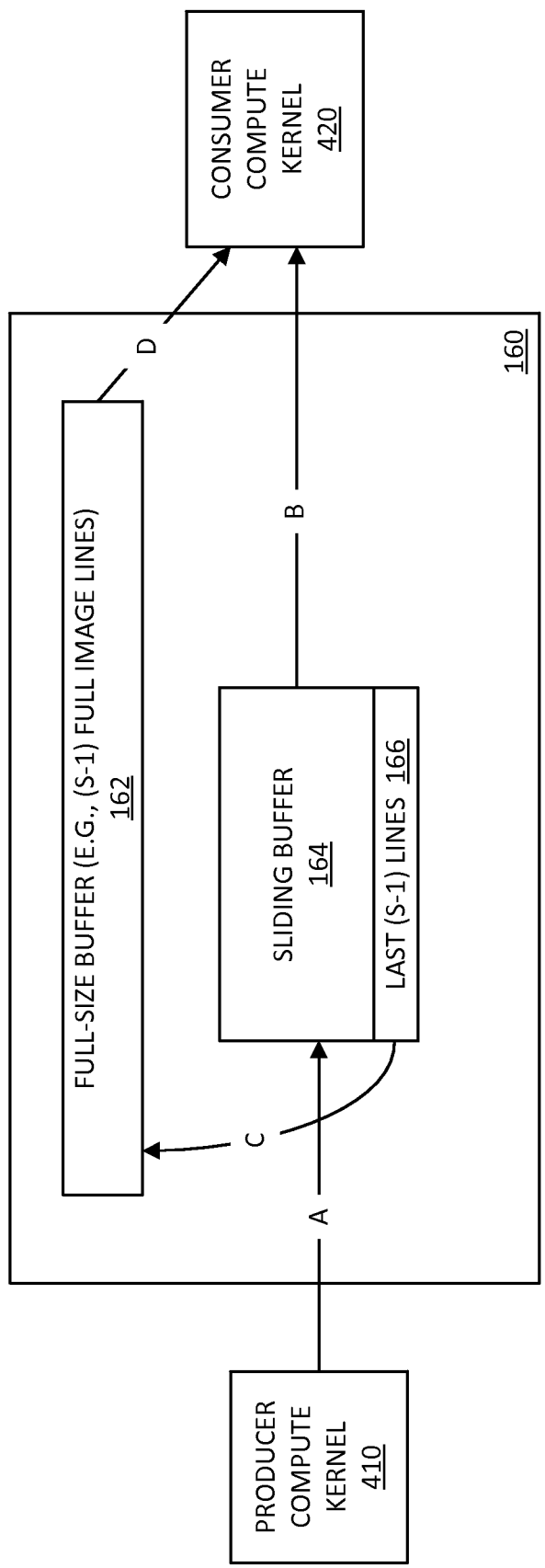
FIG. 4 is a diagram illustrating read and write operations of pixel data associated with image signal processing using an image processing stage that includes a virtual linebuffer, according to an implementation.

FIG. 4 is a diagram illustrating an approach for implementing read operations and write operations of pixel data associated with image signal processing using an image processing stage that includes a virtual linebuffer 160, such as those described herein, according to an implementation. The operations shown in FIG. 4 are given by way of example and for purposes of illustration, and other approaches are possible. For example, the order of the read and write operations could be performed in a number of appropriate orders. In other implementations, the read operations and write operation can be performed on blocks of pixel data that are sized differently than those discussed with respect to FIG. 4. In still other implementations, communicating pixel data could be done using other approaches.

In FIG. 4, the respective operations are designated by arrows referenced with 'A', 'B', 'C' and 'D', which will be referred to in the following discussion as, respectively, operation A, operation B, operation C and operation D. For purposes of the following discussion, the approach illustrated in FIG. 4 will be described with further reference to FIGS. 1, 2A, 2B and 3, as appropriate. It will be appreciated, however, that such approaches can be used in connection with ISPs having other configurations.

In the example approach of FIG. 4, operation A corresponds with writing pixel data into the sliding buffer 164 of the virtual buffer 160. In an implementation (e.g., where J overlapping vertical S×S stencils are process by the consumer kernel), a producer compute kernel 410 can write output pixels to the sliding buffer 164 associated with a consumer compute kernel 420, a column of J pixels at a time. The operation B in FIG. 4 corresponds with the consumer computer kernel 420 reading pixel data from the virtual linebuffer 160 for processing (e.g., to perform the kernel's stencil operation, to apply a corresponding IPL's image processing function, to perform a given data processing function, etc.).

In this example, the consumer compute kernel 420 can read pixels (pixel data) from the sliding buffer 164 for computation (processing) in columns of J pixels at time, which become the last J rows (in combination with pixel data from the (S−1) rows of the full-size buffer 162) of the consumer kernel 420's input slices.

In FIG. 4, operation C corresponds with writing pixel data into the full-size buffer 162 of the consumer kernel 420's virtual linebuffer 160. In this approach, the full-size buffer 162 can be implemented as a circular buffer. In such an implementation, once the data for a group of pixels in the full-size buffer 162 is consumed (read) by the consumer compute kernel 420, that data (in the full-size buffer 162) can be overwritten by pixel data corresponding with pixels in the last (S−1) rows 166 of the sliding buffer. In other words, the full-size buffer 162 can be continuously updated with pixel data from the last (S−1) lines 166 of the sliding buffer 164, where the pixel data for the last (S−1) lines 166 are written to the full-size buffer 162, overwriting previously buffered pixel data after it has been read (consumed) by the consumer compute kernel 420.

Operation D of FIG. 4 corresponds with the consumer compute kernel 420 reading pixel data from the full-size buffer 162. In this implementation, the consumer compute kernel 420 can read (S−1) lines of pixel data for pixels that are, for example, vertically aligned with the J pixels read from the sliding buffer 164. In such an approach, the first (S−1) rows of pixel data read from the full-size buffer 162 can be used by the consumer compute kernel as the first (S−1) lines of its input slices (in combination with the J line that a read from the sliding buffer and vertically aligned with the (S−1) lines read from the full-size buffer 162).

Figure 5:
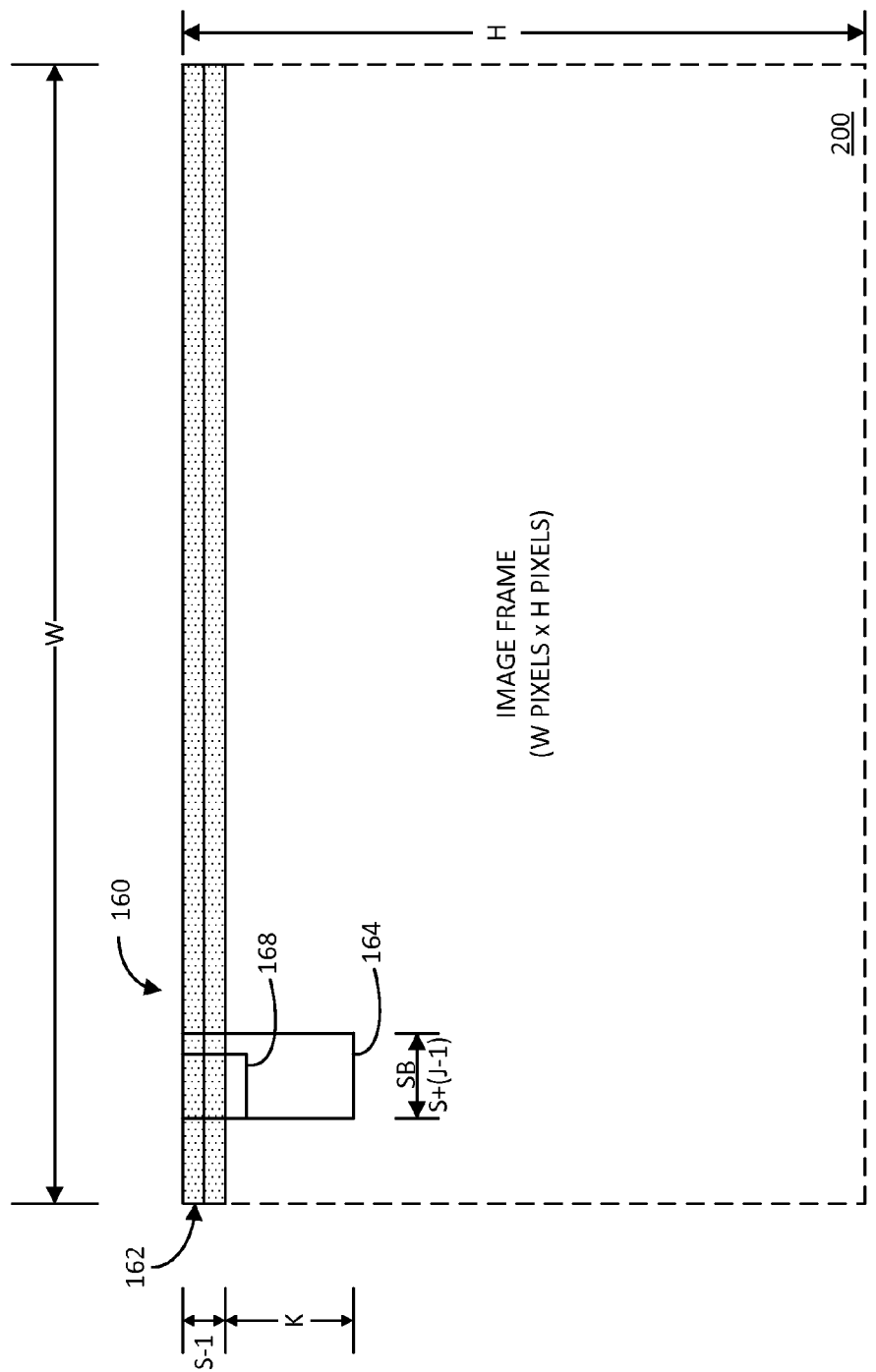
FIG. 5 is a diagram illustrating operation of another virtual linebuffer included in an image processing stage, according to an implementation.

FIG. 5 is a diagram illustrating operation of another virtual linebuffer 164 that can be included in an image processing stage, according to an implementation. Using the approach illustrated in FIG. 5, more than one horizontal stencil can be processed at a time, so as to improve image signal data processing throughput. In other words, both vertically and horizontally overlapping stencils can be processed at the same time using the approach illustrated in FIG. 5.

In such approaches, a width of the sliding buffer 164 can be increased to buffer a wider slice of pixels of an input pixel data stream for a given image processing stage 120. In order to prevent adverse effects on image processing throughput, such approaches may utilize more computing resources than, for example, the approach illustrated with respect to FIG. 2 (e.g., in order to compute more pixels in a same amount of time for horizontal and vertically overlapping stencils). Such approaches, in order to not adversely impact image signal processing throughput, may also result in an increase of the desired read and write bandwidths for the sliding buffer 164 and the full-size buffer 162.

In FIG. 5, a single 3×3 (S×S) stencil 168 is shown for reference. In this example, the sliding buffer 164 can be used (in conjunction with the (S−1) lines of pixel data buffered in the full-size buffer 162 and an associated IPL 170) to process pixels for J horizontally overlapping columns of K vertically overlapping stencils. In other words, (K+(S−1))×(J+(S−1)) pixels of image data for an image associated with the image frame 200 can be processed as a slice to produce an output slice with a height of K pixels and a width of J pixels. In this example, K=6 and J=2. In other implementations, K and J can have different values. For instance, in some implementations, the values of K and J can be equal. In such approaches, K and J can be greater than 1 and less than H, S can be greater than or equal to 2, and W can be greater than S.

As shown in FIG. 5, a virtual linebuffer 160, in this implementation, can include a full-size buffer 162 having a width of W and a height of (S−1) data pixel lines. The virtual linebuffer 160 of FIG. 5 can also include a sliding buffer 164 having a width of SB and a height of K, where SB is greater than or equal to S+(J−1) and less than W. In this example, SB is great than or equal to 4, as J=2 and S equals 3.

A virtual linebuffer 160, as described with respect to FIG. 5 can be included in an image processing stage 120 of the ISP 100 of FIG. 1A. Other image processing stages of the ISP can include linebuffers using a K×(J+S−1) sliding buffer 164 to also produce K×J output pixel slices for an image of the image frame 200. In other implementations, other image processing stages of the ISP 100 can be implemented using linebuffers having other configurations, such as those described herein, e.g., where those image processing stages produce output pixel data slices that are not K×J pixels. As with other approaches described herein, the virtual linebuffer 160 of FIG. 5 can be used to produce slice-rows by producing output pixels slices for the image of image frame 200 in a raster scan order (left-to-right and top-to-bottom).

Figure 6:
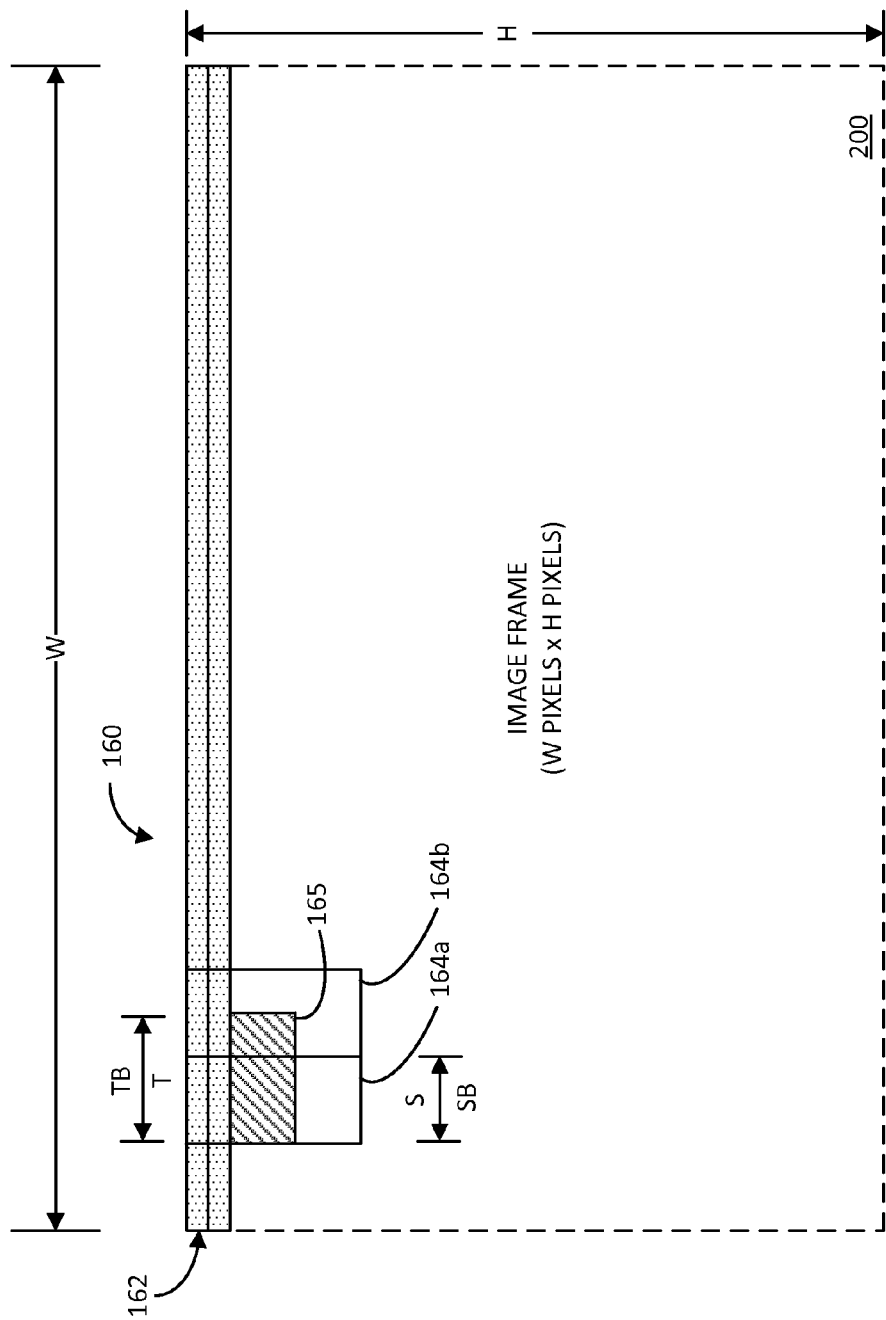
FIG. 6 is a diagram illustrating operation of virtual linebuffers of successive image processing stages that use different stencil sizes, according to an implementation.
Figure 7:
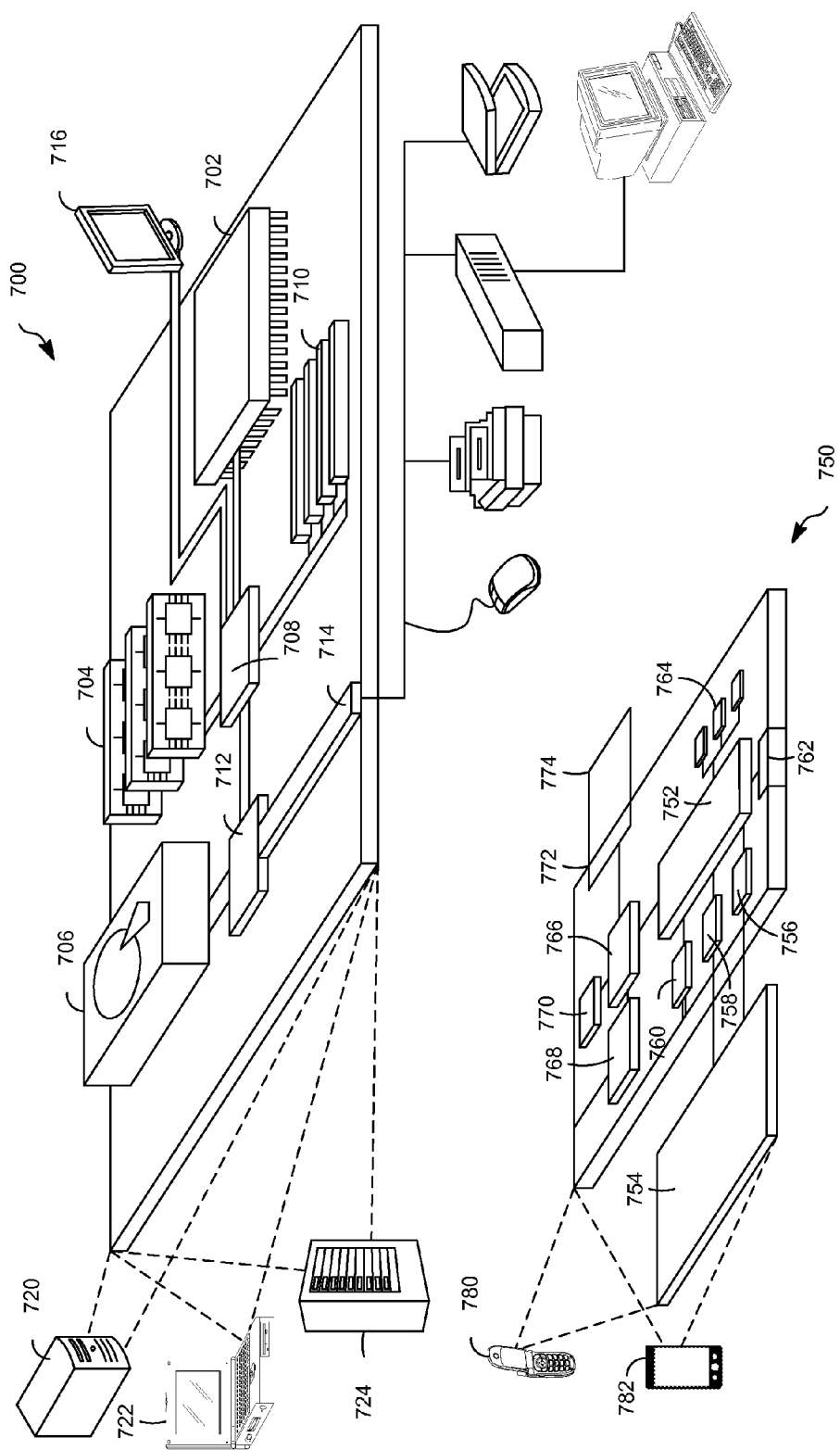
FIG. 7 is a diagram illustrating an example of a computer device and a mobile computer device that can be used to implement the techniques described here.

FIG. 6 is a diagram illustrating operation of virtual linebuffers of successive image processing stages that use different stencil sizes, according to an implementation. As has been noted above, stencil sizes of a producer compute kernel and an associated consumer compute kernel do not have to be the same. In other words, the width (and height) of stencil sizes and corresponding pixel output slices written by a producer compute kernel to a linebuffer of a consumer compute kernel (slices 164a and 164b in FIG. 6, and the width (and height) of input pixel slices read by the consumer compute kernel from its linebuffer (slice 165 in FIG. 6) can be different. Handling such cases may require more complicated linebuffer FIFO control logic than approaches where the output pixel slices of the producer stage and input pixel slices of the associated consumer stage are the same size. The details of such control logic will depend on the specific implementation.

In the example of FIG. 6, the output slices from a producer stage are taller and narrower than the input slices 165 of the consumer stage. In this example, the producer stage may produce an output slice with a height of K and a width of S or SB (e.g., SB can also be the width of the sliding buffer for the producer stage). The consumer stage may read input slices having a height of L and a width of T or TB (e.g., TB can also be the width of the sliding buffer for the consumer stage). In such an approach, the consumer stage can begin processing its input slice 165 only after both of the output slices 164a and 164b have been written to the consumer's linebuffer by the producer.

In a general aspect, an apparatus can include image processing logic (IPL) configured to perform an image processing operation on pixel data corresponding with an image having a width of W pixels and a height of H pixels to produce output pixel data in vertical slices of K pixels using K vertically overlapping stencils of S×S pixels, where K is greater than 1 and less than H, S is greater than or equal to 2, and W is greater than S. The apparatus can also include a linebuffer operationally coupled with the IPL, the linebuffer configured to buffer the pixel data for the IPL. The linebuffer can include a full-size buffer having a width of W and a height of (S−1). The linebuffer can also include a sliding buffer having a width of SB and a height of K, SB being greater than or equal to S and less than W.

Example implementations can include one or more of the following features. For instance, the IPL can be configured to produce the vertical slices of the output pixel data in a raster order. An image processing function of the IPL can be programmable. An image processing function of the IPL can be fixed.

The IPL can be a first IPL, the linebuffer can be a first linebuffer, the image processing operation can be a first image processing operation and the output pixel data can be first output pixel data. The apparatus can include second IPL configured to perform a second image processing operation on the first output pixel data to produce second output pixel data in vertical slices of L pixels using L overlapping stencils of T×T pixels, L being greater than 1 and less than H, T being greater than or equal to 2. The apparatus can include a second linebuffer operationally coupled between the first IPL and the second IPL, the second linebuffer configured to buffer the first output pixel data for the second IPL. The full-size buffer can be a first full-size buffer and the sliding buffer can be a first sliding buffer. The second linebuffer can include a second full-size buffer having a width of W and a height of (T−1) and a second sliding buffer having a width of TB and a height of L, TB being greater than or equal to T and less than W. L can be equal to K and T can be equal to S. L can be not equal to K and T can be not equal to S.

The apparatus can include an image data source operationally coupled with the linebuffer. The image data source can be configured to store the pixel data corresponding with the image. W can be at least an order of magnitude greater than S. The full-size buffer can include a circular data buffer. The sliding buffer can include a first-in-first-out (FIFO) data buffer.

In another general aspect, an apparatus can include image processing logic (IPL) configured to perform an image processing operation on pixel data corresponding with an image having a width of W pixels and a height of H pixels to produce output pixel data in slices having a height of K pixels and a width of J pixels using K×J overlapping stencils of S×S pixels. K and J are greater than 1 and less than H, S is greater than or equal to 2, and W is greater than S. The apparatus can also include a linebuffer operationally coupled with the IPL, the linebuffer configured to buffer the pixel data for the IPL. The linebuffer can include a full-size buffer having a width of W and a height of (S−1) and a sliding buffer having a width of SB and a height of K, SB being greater than or equal to S+(J−1) and less than W.

Example implementations can include one or more of the following features. For instance, the IPL can be a first IPL, the linebuffer can be a first linebuffer, the image processing operation can be a first image processing operation and the output pixel data can be first output pixel data. The apparatus can include second IPL configured to perform a second image processing operation on the first output pixel data to produce second output pixel data slices and a second linebuffer operationally coupled between the first IPL and the second IPL, the second linebuffer configured to buffer the first output pixel data for the second IPL. A slice of the second output pixel data slices produced by the second IPL can have a height of K and a width of J. A slice of the second output pixel data slices produced by the second IPL can have a height that is not equal to K and a width that is not equal J. The IPL can be configured to produce the slices of the output pixel data in a raster order.

In another general aspect, an image signal processor (ISP) can include an image data source configured to buffer pixel data corresponding with an image having a width of W pixels and a height of H pixels. The ISP can also include a first image processing stage having first image processing logic (IPL) configured to perform a first image processing operation on pixel data corresponding with an image having a width of W pixels and a height of H pixels to produce first output pixel data in vertical slices of K pixels using K vertically overlapping stencils of S×S pixels, K being greater than 1 and less than H, S being greater than or equal to 2, and W being greater than S. The first image processing stage can also include a first linebuffer operationally coupled with the first IPL, the first linebuffer configured to buffer the pixel data for the first IPL. The first linebuffer can include a first full-size buffer having a width of W and a height of (S−1) and a first sliding buffer having a width of SB and a height of K, SB being greater than or equal to S and less than W. The ISP can further include a second image processing stage having second IPL configured to perform a second image processing operation on the first output pixel data to produce second output pixel data in vertical slices of L pixels using L overlapping stencils of T×T pixels, L being greater than 1 and less than H, T being greater than or equal to 2. The second image processing stage can also include a second linebuffer operationally coupled between the first IPL and the second IPL, the second linebuffer configured to buffer the first output pixel data for the second IPL.

Example implementations can include one or more of the following features. For instance, the second linebuffer can include a second full-size buffer having a width of W and a height of (T−1) and a second sliding buffer having a width of TB and a height of L, TB being greater than or equal to T and less than W. T can be equal to S, and L can be equal to K.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth®, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic disks, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Therefore, other implementations are within the scope of the following claims.

What is claimed is:

1. An apparatus comprising:
   image processing logic (IPL) configured to perform an image processing operation on pixel data corresponding with an image having a width of W pixels and a height of H pixels to produce output pixel data in vertical slices of K pixels using K vertically overlapping stencils of S×S pixels, K being greater than 1 and less than H, S being greater than or equal to 2, and W being greater than S; and
   a linebuffer operationally coupled with the IPL, the linebuffer configured to buffer the pixel data for the IPL, the linebuffer including:
      a full-size buffer having a width of W and a height of (S−1); and
      a sliding buffer having a width of SB and a height of K, SB being greater than or equal to S and less than W.

2. The apparatus of claim 1, wherein the IPL is configured to produce the vertical slices of the output pixel data in a raster order.

3. The apparatus of claim 1, wherein the IPL is a first IPL, the linebuffer is a first linebuffer, the image processing operation is a first image processing operation and the output pixel data is first output pixel data, the apparatus further comprising:
- second IPL configured to perform a second image processing operation on the first output pixel data to produce second output pixel data in vertical slices of L pixels using L overlapping stencils of T×T pixels, L being greater than 1 and less than H, T being greater than or equal to 2; and
- a second linebuffer operationally coupled between the first IPL and the second IPL, the second linebuffer configured to buffer the first output pixel data for the second IPL.

4. The apparatus of claim 3, wherein the full-size buffer is a first full-size buffer and the sliding buffer is a first sliding buffer, the second linebuffer including:
- a second full-size buffer having a width of W and a height of (T−1); and
- a second sliding buffer having a width of TB and a height of L, TB being greater than or equal to T and less than W.

5. The apparatus of claim 3, wherein L is equal to K and T is equal to S.

6. The apparatus of claim 3, wherein L is not equal to K and T is not equal to S.

7. The apparatus of claim 1, wherein an image processing function of the IPL is programmable.

8. The apparatus of claim 1, wherein an image processing function of the IPL is fixed.

9. The apparatus of claim 1, further comprising an image data source operationally coupled with the linebuffer, the image data source being configured to buffer the pixel data corresponding with the image.

10. The apparatus of claim 1, wherein W is at least an order of magnitude greater than S.

11. The apparatus of claim 1, wherein the full-size buffer includes a circular data buffer.

12. The apparatus of claim 1, wherein the sliding buffer includes a first-in-first-out (FIFO) data buffer.

13. An apparatus comprising:
- image processing logic (IPL) configured to perform an image processing operation on pixel data corresponding with an image having a width of W pixels and a height of H pixels to produce output pixel data in slices having a height of K pixels and a width of J pixels using K×J overlapping stencils of S×S pixels, K and J being greater than 1 and less than H, S being greater than or equal to 2, and W being greater than S; and
- a linebuffer operationally coupled with the IPL, the linebuffer configured to buffer the pixel data for the IPL, the linebuffer including:
  - a full-size buffer having a width of W and a height of (S−1); and
  - a sliding buffer having a width of SB and a height of K, SB being greater than or equal to S+(J−1) and less than W.

14. The apparatus of claim 13, wherein the IPL is a first IPL, the linebuffer is a first linebuffer, the image processing operation is a first image processing operation and the output pixel data is first output pixel data, the apparatus further comprising:
- second IPL configured to perform a second image processing operation on the first output pixel data to produce second output pixel data slices; and
- a second linebuffer operationally coupled between the first IPL and the second IPL, the second linebuffer configured to buffer the first output pixel data for the second IPL.

15. The apparatus of claim 14, wherein a slice of the second output pixel data slices produced by the second IPL has a height of K and a width of J.

16. The apparatus of claim 14, wherein a slice of the second output pixel data slices produced by the second IPL has a height that is not equal to K and a width that is not equal J.

17. The apparatus of claim 13, wherein the IPL is configured to produce the slices of the output pixel data in a raster order.

18. An image signal processor (ISP) comprising:
- an image data source configured to buffer pixel data corresponding with an image having a width of W pixels and a height of H pixels;
- a first image processing stage including:
  - first image processing logic (IPL) configured to perform a first image processing operation on pixel data corresponding with an image having a width of W pixels and a height of H pixels to produce first output pixel data in vertical slices of K pixels using K vertically overlapping stencils of S×S pixels, K being greater than 1 and less than H, S being greater than or equal to 2, and W being greater than S; and
  - a first linebuffer operationally coupled with the first IPL, the first linebuffer configured to buffer the pixel data for the first IPL, the first linebuffer including:
    - a first full-size buffer having a width of W and a height of (S−1); and
    - a first sliding buffer having a width of SB and a height of K, SB being greater than or equal to S and less than W; and
- a second image processing stage including:
  - second IPL configured to perform a second image processing operation on the first output pixel data to produce second output pixel data in vertical slices of L pixels using L overlapping stencils of T×T pixels, L being greater than 1 and less than H, T being greater than or equal to 2; and
  - a second linebuffer operationally coupled between the first IPL and the second IPL, the second linebuffer configured to buffer the first output pixel data for the second IPL.

19. The ISP of claim 18, wherein the second linebuffer includes:
- a second full-size buffer having a width of W and a height of (T−1); and
- a second sliding buffer having a width of TB and a height of L, TB being greater than or equal to T and less than W.

20. The ISP of claim 18, wherein T is equal to S, and L is equal to K.

* * * * *